Nov. 7, 1939.   J. M. BIERER   2,179,444
SHAPING AND VULCANIZING BELTING AND THE LIKE
Filed June 2, 1937
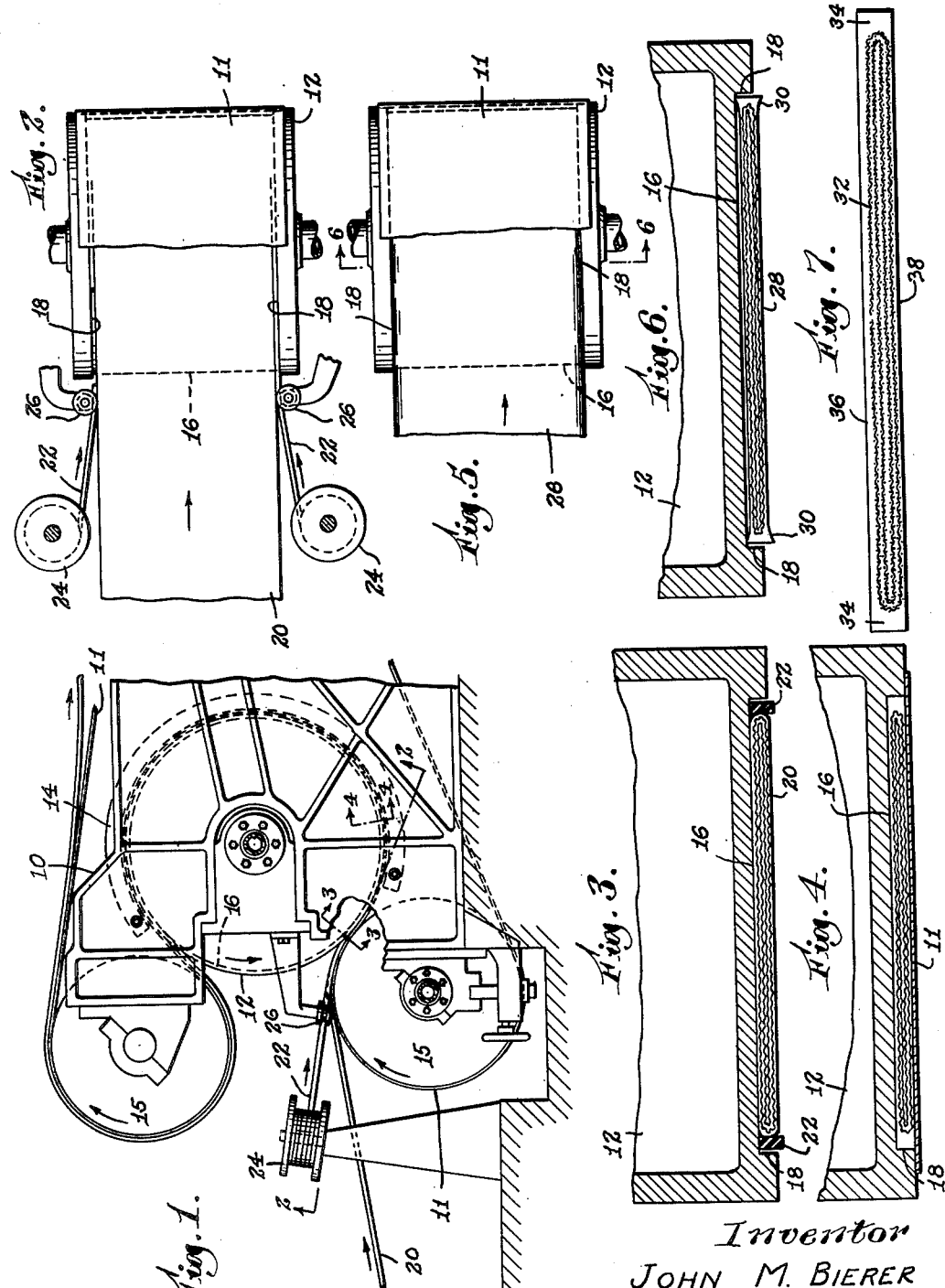
Inventor
JOHN M. BIERER
by Kenway & Witter
Attorneys Patented Nov. 7, 1939

2,179,444

UNITED STATES PATENT OFFICE 2,179,444

SHAPING AND VULCANIZING BELTING AND THE LIKE

John M. Bierer, Waban, Mass., assignor to Boston Woven Hose & Rubber Company, Cambridge, Mass., a corporation of Massachusetts Application June 2, 1937, Serial No. 146,015

6 Claims. (Cl. 18—53)

This invention relates to a method of shaping and vulcanizing belting and the like and particularly conveyor belting. Such belting is relatively thick and is constructed of several plies of fabric covered on both faces and both edges with rubber, the purpose of the cover being to protect the belting against wear and to seal the fabric against the ingress of moisture which would cause rapid deterioration. Heretofore the vulcanizing of rubber covers, on both faces and edges, has presented considerable difficulty due particularly to the forming of air blisters and press overlaps, and the proper forming and vulcanizing of the edges to withstand the necessary wear and tear has presented an even greater problem, it being understood that conveyor belting is particularly subject to damage and deterioration from the edges which strike and rub against conveyor structures and guiding devices in use. The primary object of my invention resides in the production of a novel method of uniformly vulcanizing the rubber covers of belting and more particularly for properly forming and vulcanizing the edges of the belting in a superior manner eliminating these difficulties.

My invention contemplates not only the continuous curing of the belting in a manner eliminating the said blisters and press overlaps, but furthermore the curing of such belting to an absolutely uniform and predetermined width and thickness and the formation of full and completely protected and thoroughly vulcanized edges. In practising the invention, I feed the uncured belting into a continuous trough-like molding channel having a bottom wall and side walls and of a width and depth corresponding to said predetermined width and thickness. The said walls are moved along longitudinally during the feeding movement and an enclosing top wall is applied thereto and the belting placed under pressure at all four walls and thus molded to the proper width and thickness. The channel walls together with the belting is thereupon continued through a predetermined vulcanizing path whereat the belting is vulcanized on all four sides while thus confined. The belting is furthermore placed under predetermined tension and held in that condition during vulcanization.

The uncured belting is preferably of a thickness slightly greater than the thickness of the finished belting whereby it is compressed during the curing treatment. Proper formation of the edges of the belting, however, requires a substantial amount of rubber, and in accordance with my invention, I provide this rubber by feeding into the channel adjacent to the side walls thereof a continuous supply of rubber simultaneously with the feeding of the uncured belting thereinto. This supply of rubber may be provided either independently of or as a part of the uncured belting. When this rubber is fed to the channel with and as a part of the uncured belting such belting may be of substantially the width of the channel but it is considerably thickened at the edges due to the additional rubber. When the rubber is fed independently, the belting will be narrower than the channel whereby leaving narrow gaps between the side walls and the edges of the belting and the additional rubber may be fed into these gaps simultaneously with the feeding of the belting, and, in accordance with one preferred embodiment of the invention, this rubber will be fed in strip form. The treatment is preferably continuous, the belting with the additional rubber supply being fed continuously into the channel and crowded thereinto under substantial pressure completely filling the channel and bringing the edge portions of the belting into full and intimate contact with the edge walls of the channel whereby shaping the edges exactly to the channel and completely vulcanizing both faces and edges thereof uniformly throughout the length of the belting.

These and other features of the invention will be best understood and appreciated from the following description of preferred embodiments thereof, selected for purposes of illustration and shown in the accompanying drawing in which, Fig. 1 is a fragmentary side elevation of an apparatus illustrating one embodiment of my invention, Fig. 2 is a fragmentary plan view taken on the line 2—2 of Fig. 1, Fig. 3 is an enlarged fragmentary sectional view through the vulcanizing drum and belting, taken on line 3—3 of Fig. 1 the band supporting roll being omitted, Fig. 4 is a similar view taken on line 4—4 of Fig. 1, Fig. 5 is a fragmentary plan view similar to Fig. 2 but illustrating a modified form of the invention, Fig. 6 is a fragmentary sectional view taken on line 6—6 of Fig. 5, and Fig. 7 is a cross sectional view through the completed belting.

Conveyor belting ordinarily comprises a plurality of plies of fabric having both faces and both edges covered with rubber as a protection against wear and to prevent moisture from reaching the fabric, the finishing of the edges of the belting being particularly important as a protection against damage caused by the belting striking against conveyor structures, guiding devices, etc.

Heretofore such belting has been vulcanized on both faces and both edges in a flat press, the edges being treated by long side irons placed between the two platens and brought into contact with the edges of the belting while its two faces are engaged by the platens. Such treatment is not only difficult to perform but the inability to locate the side irons accurately and the intermittent character of the treatment produce a belting having imperfect edges and one in which blistering, particularly at the press overlaps, is a serious defect. In this intermittent treatment, the soft rubber covers are so deeply indented by the pressure of the hot platens that rubber forced out from beneath the platens forms into a lump or semi-cured area just outside the press. This area usually contains entrapped air and in its subsequent vulcanization such air tends to cause blistering and serious defects. In accordance with my improved method, the belting is placed continuously under pressure in a mold of predetermined dimensions and is vulcanized continuously on both faces and both edges to such dimensions, whereby producing a belting of uniform character and size throughout and wherein the defects and objections present in such belting heretofore produced are eliminated.

My novel method of shaping and vulcanizing such belting is best shown in the accompanying drawing wherein I have illustrated a suitable machine for practising the method. The heavy metal frame of the machine comprises side members 10 of similar shape rigidly connected and supported upon a concrete foundation. The frame is designed to support three rolls over which passes a relatively wide steel tension band 11 in a generally triangular path with a re-entrant loop extending about the periphery of a large vulcanizing drum or cylinder 12 supported by the frame within the general outline of the path of the band. The vulcanizing drum 12 is steam heated and cooperating with a relatively large segmental portion thereof is a steam heated jacket 14. The drum is furthermore provided with an open channel extending continuously therearound and bounded on three sides by a bottom wall 16 and two side walls 18, the manner of forming the channel being of secondary importance. Two of the band supporting rolls are located adjacent to and forwardly of the vulcanizing drum at 15 and a third roll is located rearwardly of the drum, the tension band being supported on these rolls and engaging the drum beneath the jacket 14. The band is of a width spanning the channel 16—18 and may be brought to and held under the desired tension in the manner disclosed in my Patent No. 2,039,271. The drum is rotated slowly in the direction indicated by the arrow and the belting to be vulcanized is fed into the channel at the bite formed between the band and the drum as the band leaves the lower roll 15.

The uncured belting will in all cases preferably be slightly thicker than the depth of the channel 16—18 whereby the belting will be compressed during its passage around the drum. Furthermore, the belting will preferably be placed under considerable tension and condition of stretch prior to its engagement with the drum, this step being carried out in any suitable manner as, for example, in the manner disclosed in Reissue Patent No. 19,660. It will be understood that vulcanizing the belting under constant and uniform tension produces a finished belting wherein the amount of stretch remaining is substantially uniform throughout the length of the belting.

In the embodiment of my invention illustrated in Figs. 1-4, the uncured belting 20 is of a width somewhat narrower than the channel 16—18 whereby leaving gaps at opposite edges of the channel between the edges of the belting and the side walls 18. Simultaneously with the feeding of the belting into the channel, and somewhat forwardly of the bite of the band 11 with the drum, I feed two strips 22 of rubber along with the belting at the two edges thereof, these strips passing into the said gaps along with the belting. The purpose of these strips is to provide a supply of rubber in sufficient quantity completely to fill the channel together with the belting and fully form the edge portions thereof, the strips being somewhat thicker than the belting and the depth of the channel whereby to provide a full supply of rubber. The strips may be drawn from reels 24 and guided by rolls 26, or provided and guided in any other suitable manner.

As the belting and strips pass into the bite the tension band 11 engages therewith and crowds them into the channel under considerable pressure and the band thereupon becomes a top wall for the channel completely enclosing the belting unit as illustrated in Fig. 4. It will be apparent that the belting and strips are molded into a unit the size of the channel as the unit is forced into intimate contact with the walls of the channel and whereupon the belting is compressed and its edges shaped to the full and complete form desired of the completed belting. The belting unit, now in vulcanizing contact with the mold walls at both faces and both edges, passes through the vulcanizing path beneath the jacket 14 and is thoroughly and completely vulcanized throughout its exterior surface.

In Figs. 5 and 6 I have illustrated a modified form of the invention wherein the additional rubber is originally provided as a part of the uncured belting. The intermediate portion 28 of this uncured belting is of a thickness approximating the depth of the channel and preferably slightly thicker than such depth. The edge portions 30 are substantially thicker than the intermediate portion and contain relatively more rubber, it being apparent that the belting, as illustrated in the drawing, comprises a plurality of plies of fabric covered with rubber. This uncured belting will be of a width permitting it to feed into the channel and the amount of rubber at the edges is sufficient to completely fill the channel in the molding operation. This belting is continuously molded and vulcanized in the manner already described in connection with Figs. 1-4.

In Fig. 7 I have illustrated the finished belting 32. It will be understood that this belting is uniform in character and dimensions throughout its length and both faces and edges are protected by a substantial covering of rubber fully vulcanized. The rubber cover is thicker at the edges 34 of the belting whereby giving greatest protection at these portions. It may also be observed that the rubber cover at the conveying face 36 of the belting is somewhat thicker than the rubber cover at the pulley face 38 thereof.

Having thus described my invention what I claim as new and desire to secure by Letters Patent of the United States is,

1. A method of shaping and vulcanizing belting under pressure to predetermined width and thickness, which consists in continuously feeding into a trough-like channel having a bottom wall and side walls uncured belting of a width not greater than the width of the channel and along therewith into the channel and adjacent to said side walls a continuous supply of rubber thicker than the intermediate portion of the belting or the depth of the channel, crowding said belting and said rubber into intimate molding contact with said walls during feeding movement thereof by engaging a top wall therewith and moving the top wall along in cooperation with the bottom and side walls, and continuously vulcanizing the unit at said walls while passing it through a predetermined vulcanizing path and holding it confined under said pressure and to said predetermined width and thickness, whereby producing a vulcanized belting having full and complete edge portions shaped to correspond to said side walls.

2. A method of shaping and vulcanizing belting under pressure to predetermined width and thickness, which consists in continuously feeding into a trough-like channel having a bottom wall and side walls uncured belting having a continuous supply of rubber thereon along its edge portions thicker than the portion of the belting intermediate the edge portions or the depth of the channel, crowding said belting and said rubber into intimate molding contact with said walls during feeding movement thereof by engaging a top wall therewith and moving the top wall along in cooperation with the bottom and side walls, and continuously vulcanizing the unit at said walls while passing it through a predetermined vulcanizing path and holding it confined under said pressure and to said predetermined width and thickness, whereby producing a vulcanized belting having full and complete edge portions shaped to correspond to said side walls.

3. A method of shaping and vulcanizing belting under pressure to predetermined width and thickness, which consists in continuously feeding into a trough-like channel having a bottom wall and side walls uncured belting having edge portions substantially greater than the depth of the channel and an intermediate portion of less thickness and approximating the depth of the channel, said belting comprising a plurality of plies of fabric covered with rubber and having relatively more rubber at said edge portions, moving said walls continuously in a belting-feeding direction, crowding the belting into the channel during feeding movement thereof by engaging a top wall therewith and moving the top wall along in cooperation with the bottom and side walls, and vulcanizing the belting while holding it confined within the said walls and during passage therewith through a predetermined path.

4. A method of shaping and vulcanizing belting under pressure, which consists in continuously feeding into an endless trough-like channel having a bottom wall and side walls uncured rubber covered fabric belting having its intermediate portion slightly thicker than the depth of the channel and relatively thicker edge portions containing relatively more rubber than said intermediate portion, moving said walls continuously in a belting-feeding direction, crowding the belting into intimate molding contact with said walls during feeding movement thereof by engaging a top wall therewith and moving the top wall along in cooperation with the bottom and side walls, and vulcanizing the belting while holding it confined within the said walls and during passage therewith through a predetermined path.

5. A method of shaping and vulcanizing belting under pressure to predetermined width and thickness, which consists in continuously feeding into a trough-like channel having a bottom wall and side walls uncured belting narrower than the channel and having its edges spaced from said side walls, simultaneously therewith feeding strips of rubber into the spaces at the edges of the channel, crowding said belting and said rubber into intimate molding contact with said walls during feeding movement thereof by engaging a top wall therewith and moving the top wall along in cooperation with the bottom and side walls and continuously vulcanizing the unit at said walls while passing it through a predetermined vulcanizing path and holding it confined under said pressure and to said predetermined width and thickness, whereby producing a vulcanized belting having full and complete edge portions shaped to correspond to said side walls.

6. A method of shaping and vulcanizing belting under tension and pressure to predetermined width and thickness, which consists in continuously feeding into a trough-like channel having a bottom wall and side walls uncured rubber covered fabric belting under predetermined tension and of a width not greater than the width of the channel and along therewith into the channel and adjacent to said side walls a continuous supply of rubber thicker than the intermediate portion of the belting or the depth of the channel, crowding said belting and said rubber into intimate molding contact with said walls during feeding movement thereof by engaging a top wall therewith and moving the top wall along in cooperation with the bottom and side walls, and continuously vulcanizing the unit at said walls while passing it through said predetermined vulcanizing path and holding it confined under said tension and pressure and to said predetermined width and thickness, whereby producing vulcanized and substantially stretch-proof belting having full and complete edge portions shaped to correspond to said side walls.

JOHN M. BIERER.